US006997552B1

(12) United States Patent
Hung (10) Patent No.: US 6,997,552 B1
(45) Date of Patent: Feb. 14, 2006

(54) LIGHT-EMITTING EYEGLASSES STRUCTURE

(76) Inventor: Ming-Chi Hung, 28, Lane 291, Sec.1, Chienkuo South Road, Taipei, 106 (TW)

( * ) Notice: Subject to any disclaimer, the term of this patent is extended or adjusted under 35 U.S.C. 154(b) by 0 days.

(21) Appl. No.: 10/996,898

(22) Filed: Nov. 23, 2004

(51) Int. Cl.
*G02C 11/02* (2006.01)
(52) U.S. Cl. ........................................ 351/51; 351/158
(58) Field of Classification Search ................ 351/41, 351/51, 52, 158; 362/103
See application file for complete search history.

(56) References Cited

U.S. PATENT DOCUMENTS

| 4,254,451 A | * | 3/1981 | Cochran, Jr. ............... 362/103 |
| 4,822,160 A | * | 4/1989 | Tsai ............................ 351/158 |
| 6,857,739 B1 | * | 2/2005 | Watson ...................... 351/158 |

* cited by examiner

*Primary Examiner*—Huy Mai
(74) *Attorney, Agent, or Firm*—Connolly Bove Lodge & Hutz (57) ABSTRACT

The present invention provides a light-emitting eyeglasses structure. The light-emitting eyeglasses structure comprises a frame and light-emitting devices. The frame has two transparent arms on two sides respectively, and each arm has a trench on the outside and a cover adapted to insert into the trench. The light-emitting devices are in the trenches and have a switch, a drive circuit, a light-emitting unit, and a power source. The power source comprises a control circuit, a starting circuit. The power source, the switch, the control circuit, the starting circuit, and the light-emitting unit are electrically conductible, so the power is conducted by the switch or a sensor, such as photo sensor, electricity sensor, and signal sensor, to make light-emitting unit emit a light and the light can passes through the transparent frame or arms. The eyeglasses structure according to the present invention is simple and utility, and can emit light with various means.

12 Claims, 9 Drawing Sheets

FIG. 9

LIGHT-EMITTING EYEGLASSES STRUCTURE

BACKGROUND OF THE INVENTION

1. Field of the Invention

This invention relates to a light-emitting eyeglasses structure, and more particularly to a light-emitting eyeglasses structure comprising a frame and light-emitting devices wherein the frame has two transparent arms on two sides respectively, and each arm has a trench on the outside and a cover adapted to insert into the trench.

2. Description of the Prior Art

The conventional eyeglasses are composed of a frame and arms, and the frame connects the arms on the two sides. The eyeglasses have a main function of correcting eyesight, and variations in only appearance or color of the frame or the arms to increase attractiveness. However, the recent eyeglasses are still approximately similar to each other regardless of variations in color and appearance and can't satisfy the demand of consumer.

SUMMARY OF THE INVENTION

The main objective of the present invention is to provide a light-emitting eyeglasses structure with light-emitting devices in the frame or the arms, and the light-emitting devices generates light with power under a low light condition and to be impressive and arresting.

Another objective of the present invention is to provide a light-emitting eyeglasses structure with light-emitting devices that are activated by a vibrating switch to twinkle.

A further objective of the present invention is to provide a light-emitting eyeglasses structure that is activated to generate light by sensing touch, light, electricity, sound, or signal.

DESCRIPTION OF THE PREFERRED EMBODIMENT

Some sample embodiments of the invention will now be described in greater detail. Nevertheless, it should be recognized that the present invention can be practiced in a wide range of other embodiments besides those explicitly described, and the scope of the present invention is expressly not limited expect as specified in the accompanying claims.

Figure 1:
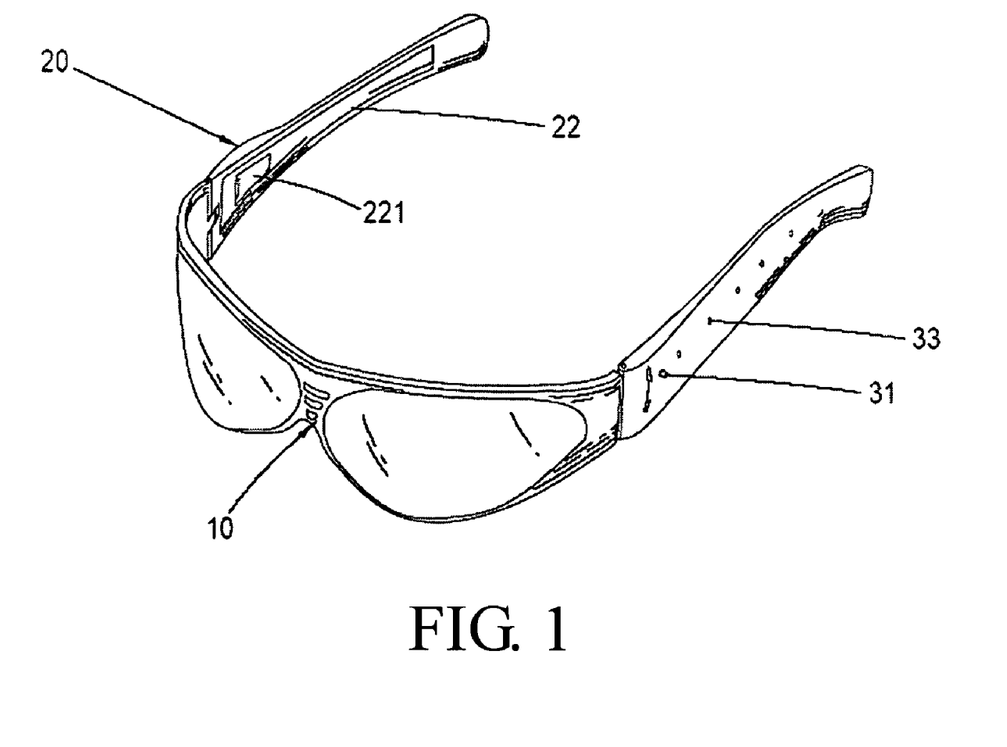
FIG. 1 is a three-dimensional schematic diagram of a preferred embodiment in the present invention.
Figure 2:
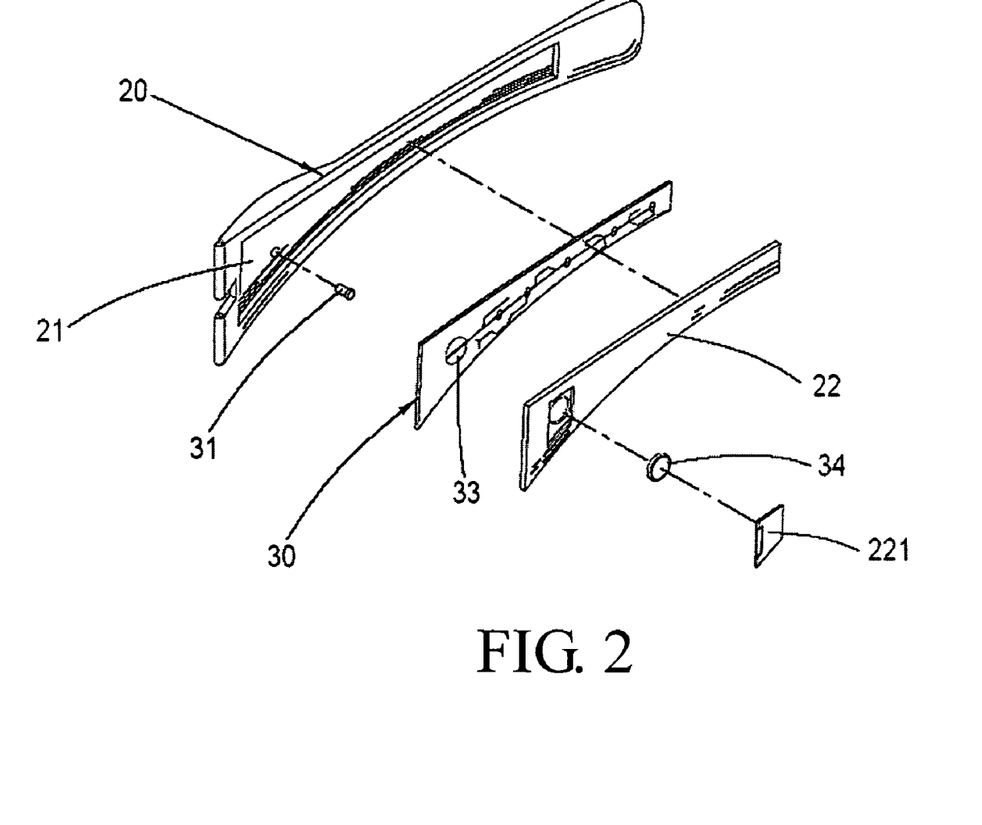
FIG. 2 is a decomposition diagram of an arm of the eyeglasses in the present invention.
Figure 3:
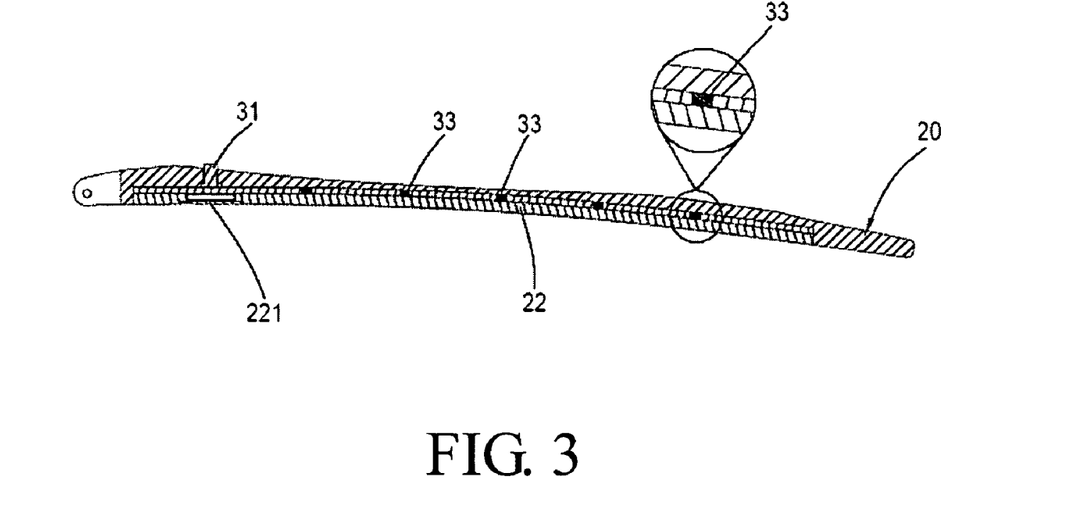
FIG. 3 is a cross-sectional view of an arm of the eyeglasses in the present invention.
Figure 4:
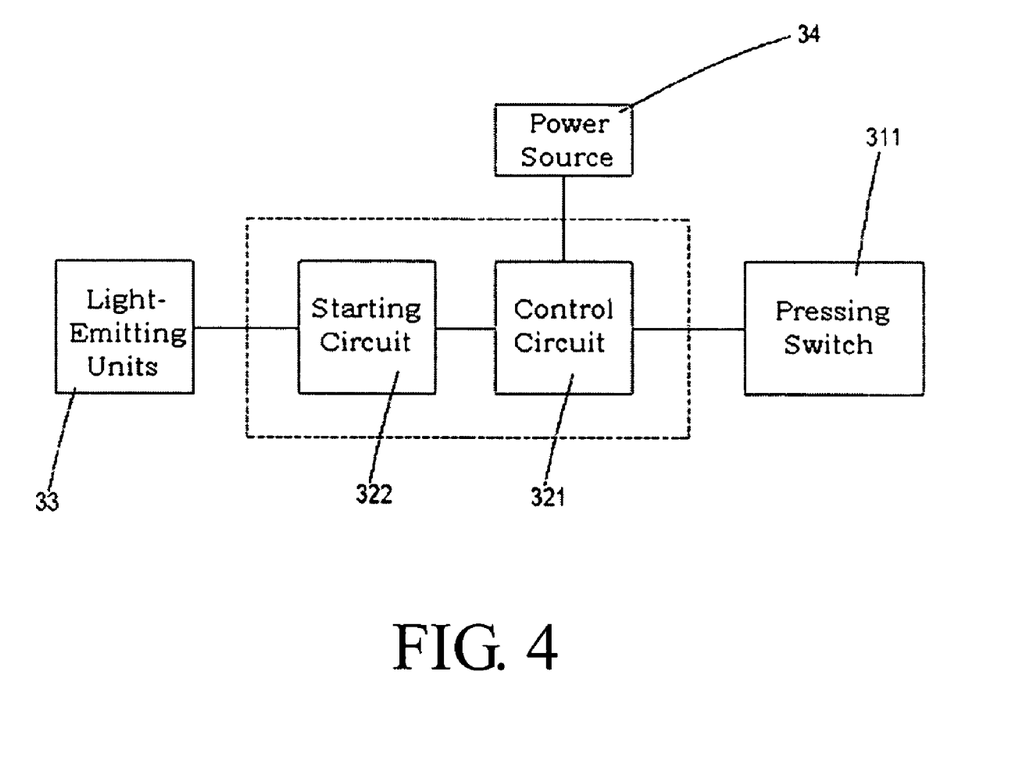
FIG. 4 is a block diagram of a preferred embodiment in the present invention with a pressing switch.
Figure 5:
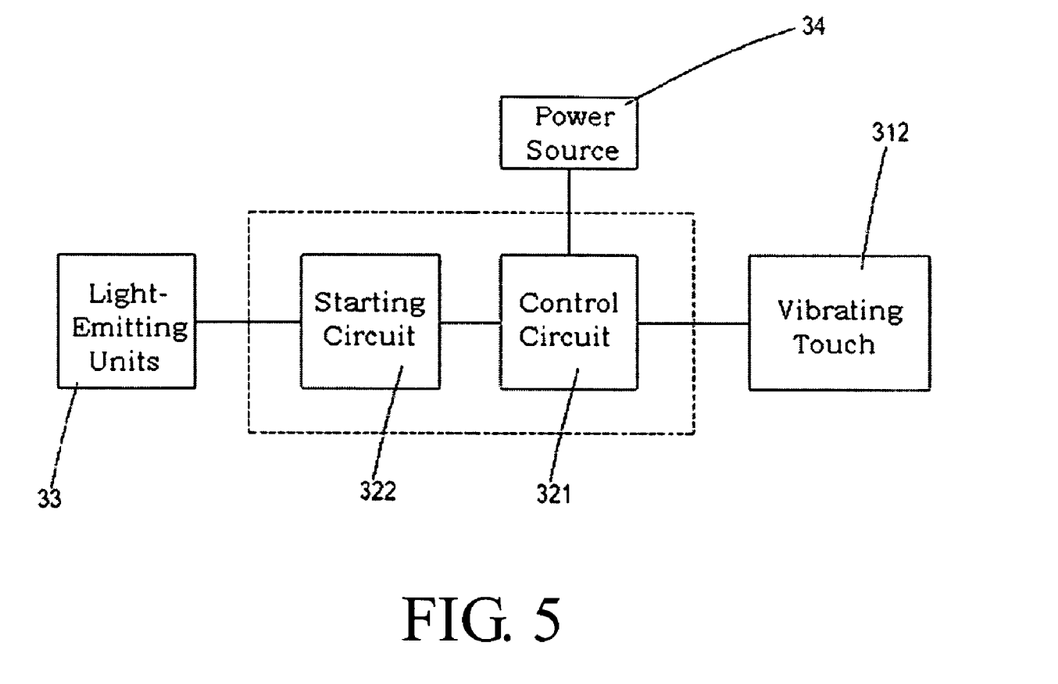
FIG. 5 is a block diagram of a preferred embodiment in the present invention with a vibrating switch.
Figure 6:
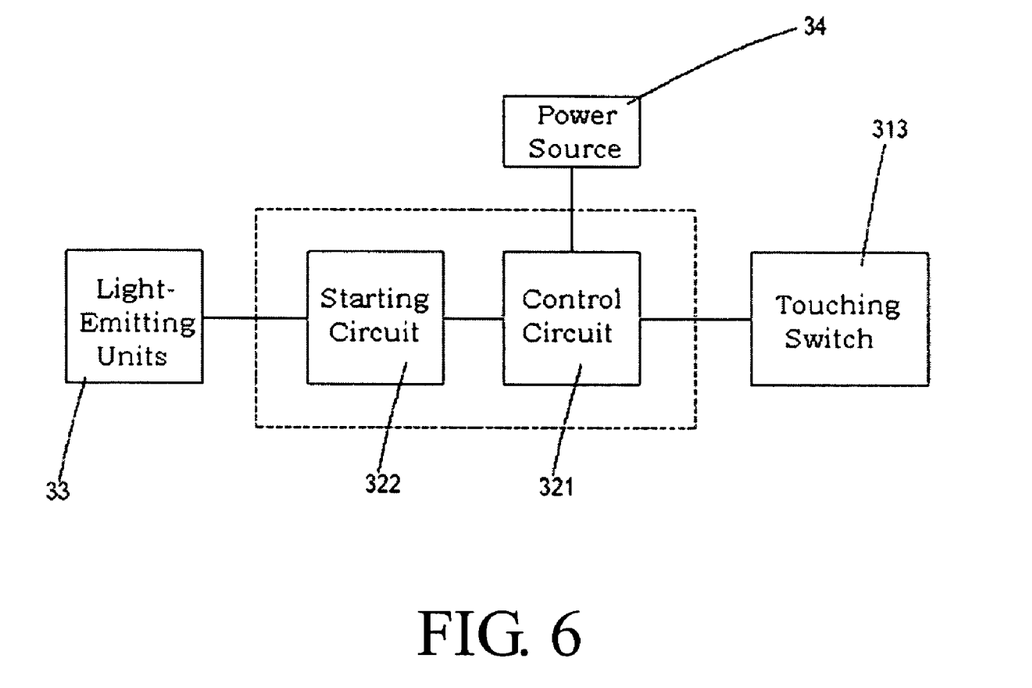
FIG. 6 is a block diagram of a preferred embodiment in the present invention with a touching switch.
Figure 7:
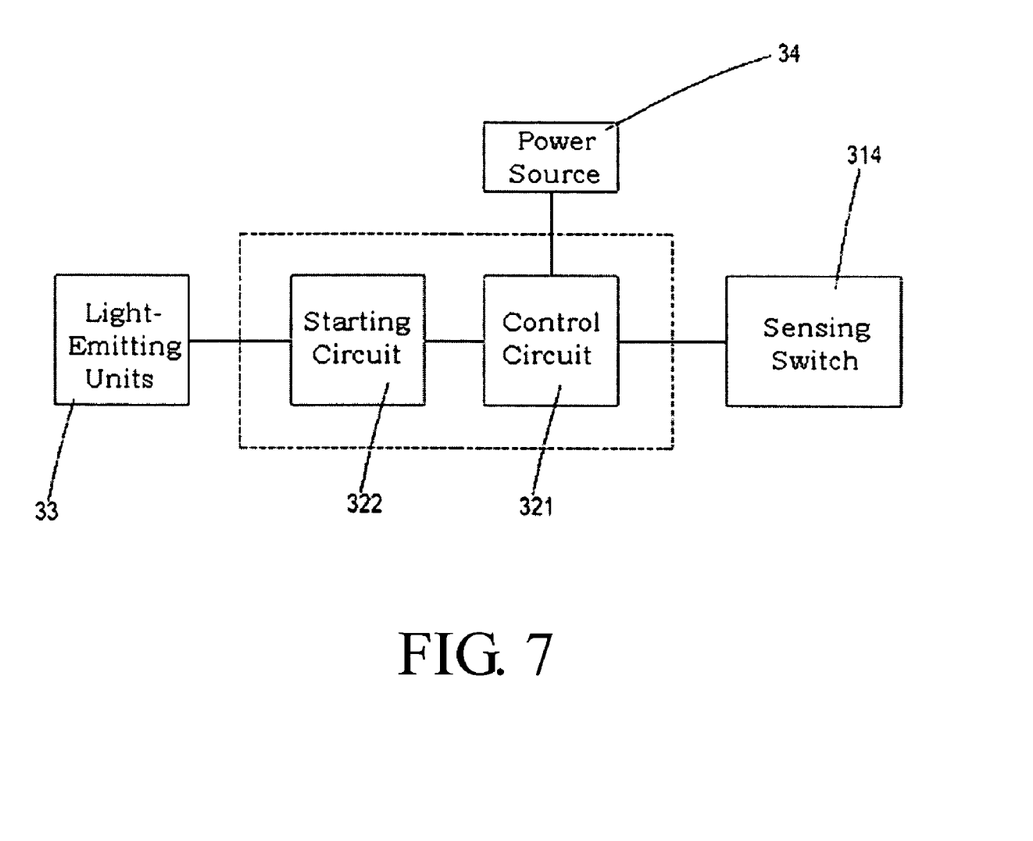
FIG. 7 is a block diagram of a preferred embodiment in the present invention with a sensor switch.

Referring to FIG. 1 to FIG. 3, they are respectively a three-dimensional schematic diagram of a light-emitting eyeglasses structure, a decomposition diagram of an arm, and a cross-sectional view of an arm of one preferred embodiment in the present invention. The light-emitting eyeglasses structure comprises a frame 10 to be installed with lenses, two transparent arms 20 on the two sides of the frame 10. Each arm 20 has an appropriate trench 21 in that a light-emitting device 30 is installed. A cover 22 is adapted to insert into the trench 21 to exactly hide the light-emitting device 30 in the trench 21. The light-emitting device 30 comprises a switch 31, a drive circuit 32, a light-emitting unit 33, and a power source 34. The light-emitting device 30 is attached to the trench 21 of the arm 20. A switch 31 and a plurality of the light-emitting units 33 are on one side of the light-emitting device 30. The drive circuit 32 comprises a control circuit 321, a starting circuit 322. The light-emitting unit 33 can be an LED, an electroluminescent panel, or a light bulb. The switch 31, the control circuit 321, the starting circuit 322, the light-emitting units 33, and the power source 34 are electrically conductible with each other to transmit electrical power with wires, metallic sheets, or sheets with electric conduction. The power source 34 can be a small-scale battery, and the arm 20 has a power source cover 221 corresponding to where the power source 34 is installed. The switch 31 is installed at an appropriate position of the arm 20, and is for conducting the power source 34. Referring to FIG. 4 to FIG. 7, the switch 31 can be a conventional pressing switch 311 (as shown in FIG. 4), a vibrating switch 312 (as shown in FIG. 5), a touching switch 313 (as shown in FIG. 6), or a switch that can be simultaneously switched by pressing, vibrating, and touching. Alternatively, the switch 31 can be a sensing switch 314 (as shown in FIG. 7) that is switched by sound, light, electricity, or signal. The switch 31 is switched on to connect the power source 34 with the control circuit 321 and make starting circuit 322 drive the light-emitting units 33 to emit light. Because the arm 20 is made of transparent material and the light-emitting device 30 in the trench 21 is closely attached on the arm 20, the light emitted from the light-emitting units 33 passes through the transparent 20. The switch 31 is selected form the pressing switch 311, the vibrating switch 312, the touching switch 313, and the sensing switch 314 according to the design of the light-emitting eyeglasses.

Figure 8:
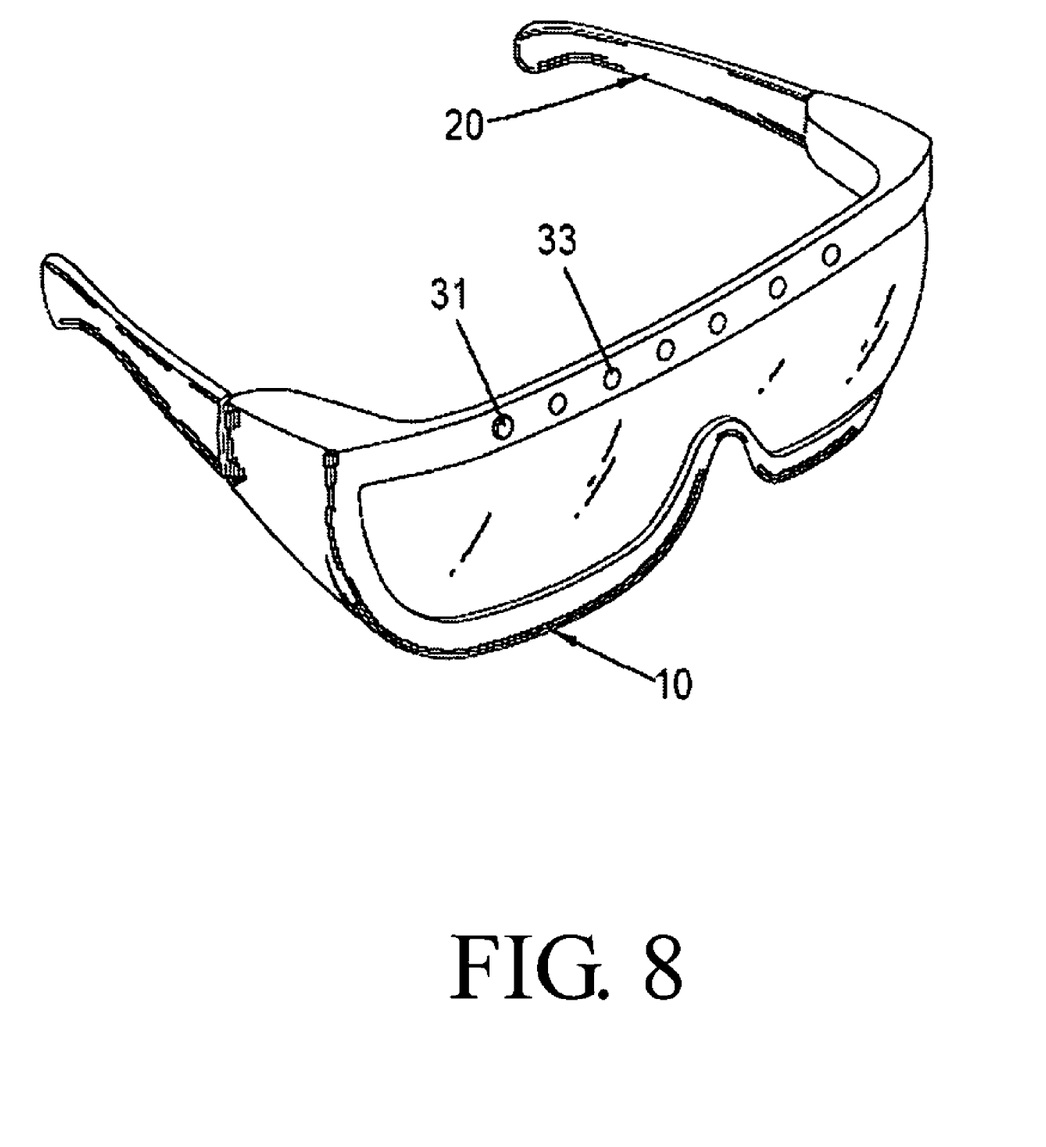
FIG. 8 is a three-dimensional schematic diagram of another preferred embodiment in the present invention.
Figure 9:
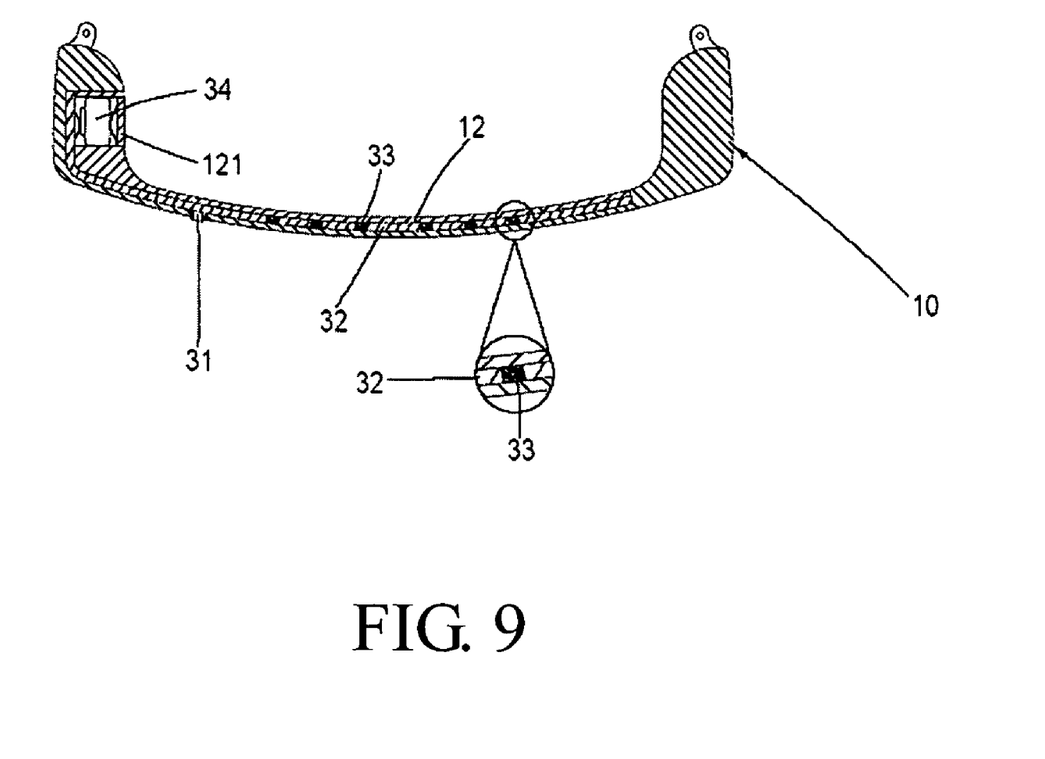
FIG. 9 is a cross-sectional view of the preferred embodiment in FIG. 8.

Referring to FIG. 8 and FIG. 9, they are schematic diagrams of another embodiment in the present invention. The light-emitting eyeglasses structure comprises a frame 10 to be installed with lenses, two transparent arms 20 on the two sides of the frame 10. The frame 10 has an appropriate trench 11 in that a light-emitting device 30 is installed. A cover 12 is adapted to insert into the trench 11 to exactly hide the light-emitting device 30 in the trench 11. The frame 10 has a power source cover 121 corresponding to where the power source 34 is installed. The light-emitting device 30 is the same as that in FIG. 1. The light-emitting unit 33 can be an LED, an electroluminescent panel, or a light bulb. The switch 31, the control circuit 321, the starting circuit 322, the light-emitting units 33, and the power source 34 are electrically conductible with each other to transmit electrical power with wires, metallic sheets, or sheets with electric conduction. Similarly, the switch 31 can be a pressing switch, a vibrating switch, a touching switch, or a sensing switch, and is switched on to connect the power source 34 and make starting circuit 322 drive the light-emitting unit 33 to emit light.

Accordingly, the feature of the present invention is to install light-emitting devices in the frame or arms of the eyeglasses for emitting various twinkling lights. Therefore, it not only increase attractiveness, but also has functions of illumination and indication. Moreover, the sensor can be activated by sound, light, electricity, or signal, and so the eyeglasses further has functions of sound control and notice of having a call.

Although specific embodiments have been illustrated and described, it will be obvious to those skilled in the art that various modifications may be made without departing from what is intended to be limited solely by the appended claims.

What is claimed is:

1. A light-emitting eyeglasses structure, comprising:
   a frame having two transparent arms on two sides respectively, wherein each arm has a trench on the outside and a cover adapted to insert into said trench; and
   light-emitting devices in said trenches, comprising a switch, a drive circuit, light-emitting units, and a power source, and said drive circuit comprising a control circuit, a starting circuit, wherein said power source, said switch, said control circuit, said starting circuit, and said light-emitting unit are electrically conductible to emit light by switching on said switch to activate said light-emitting units.

2. A light-emitting eyeglasses structure according to claim 1, wherein said light-emitting device and said power source are installed in said frame.

3. A light-emitting eyeglasses structure according to claim 2, wherein said light-emitting unit is an LED, an electroluminescent panel, or a light bulb.

4. A light-emitting eyeglasses structure according to claim 2, wherein said switch is a pressing switch or a vibrating switch.

5. A light-emitting eyeglasses structure according to claim 2, wherein said switch is a touching switch.

6. A light-emitting eyeglasses structure according to claim 2, wherein said switch is a sensing switch.

7. A light-emitting eyeglasses structure according to claim 2, wherein said cover has a power source cover corresponding to that said power source is installed on.

8. A light-emitting eyeglasses structure according to claim 1, wherein said light-emitting unit is an LED, an electroluminescent panel, or a light bulb.

9. A light-emitting eyeglasses structure according to claim 1, wherein said switch is a pressing switch or a vibrating switch.

10. A light-emitting eyeglasses structure according to claim 1, wherein said switch is a touching switch.

11. A light-emitting eyeglasses structure according to claim 1, wherein said switch is a sensing switch.

12. A light-emitting eyeglasses structure according to claim 1, wherein said cover has a power source cover corresponding to that said power source is installed on.

* * * * *